United States Patent Office.

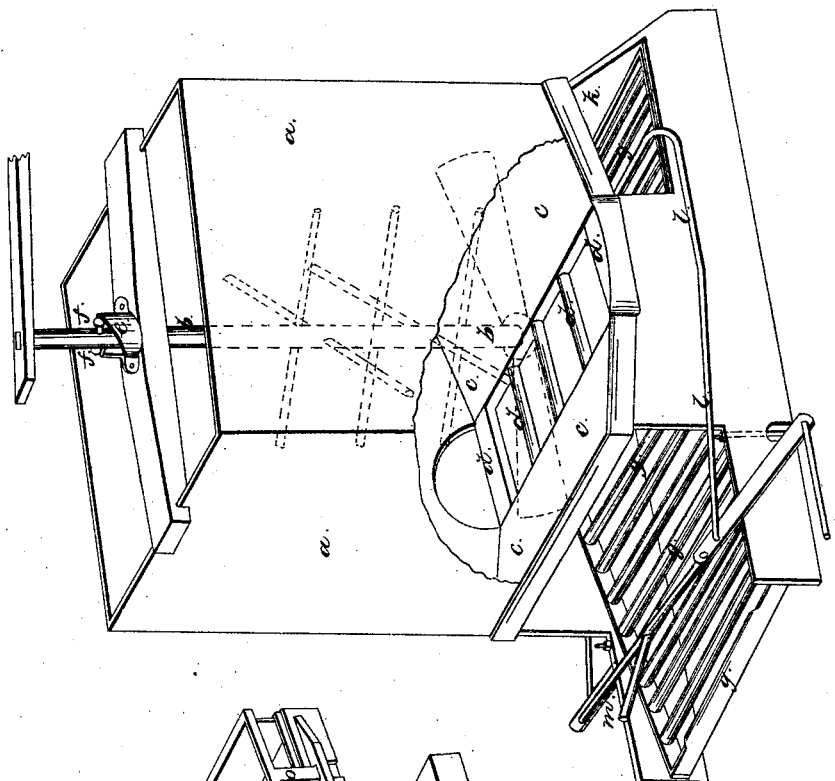
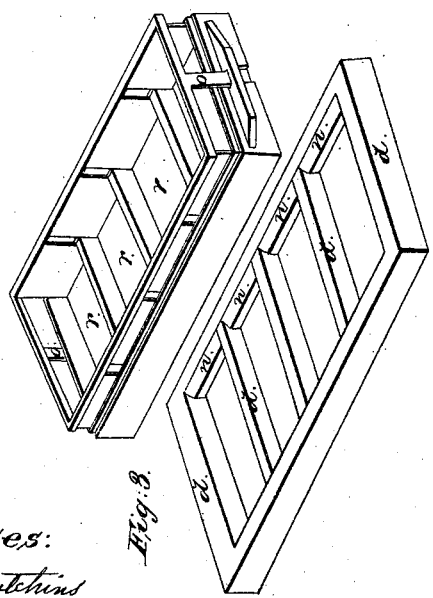
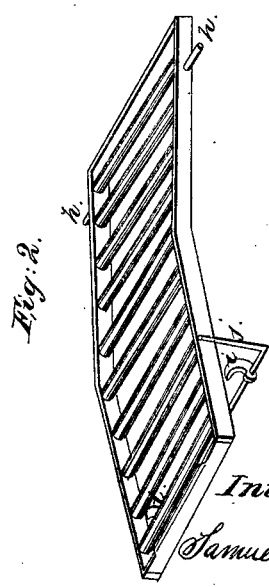

SAMUEL SHREFFLER, OF JOLIET, ILLINOIS.

*Letters Patent No. 69,592, dated October 8, 1867.*

---

IMPROVEMENT IN BRICK MACHINES.

---

The Schedule referred to in these Letters Patent and making part of the same.

---

Be it known that I, SAMUEL SHREFFLER, of the city of Joliet, in Will county, and State of Illinois, have invented a new and useful Improvement on a Brick Machine; and I do hereby declare the following to be a full, clear, and exact description and operation of the same, reference being had to the annexed drawings, making a part of this specification, in which—

Figure 1 is a perspective view of the machine,

Figure 2 an isometrical projection of the carriage,

Figure 3 an isometrical projection of the grate, and

Figure 4 a perspective view of the mould.

To enable others skilled in the art to make and use my invention, I will proceed to describe its construction and operation.

$a$ represents the mixing and grinding-box, resting on the solid cast-iron bed-plate $c$ inclined from the two outer sides to the grate $d$, as shown in fig. 1. The mixing-box is furnished with the shaft $b$, with its complement of radial mixers, in the ordinary manner. The shaft $b$ is raised and lowered in order to press the clay through the grate $d$ into the moulds beneath by means of the double-inclined spiral plane $e$, with two vertical offsets over which travel the two friction-rollers $ff$ on an axle passing through the main shaft $b$, thus giving a vertical motion to said shaft. Fig. 2 shows the carriage $g$, fig. 1, furnished with a row of rollers. This carriage rests, at the back end, on a rod, $h$, passing through its frame, and at the outer end on the dogs $i\ i$, which are operated by the lever $j$ to raise and lower that end for the purpose of pressing the mould up tight to the under side of the grate. The carriage is inclined from the centre to the outer end, as shown in fig. 2, for the purpose of carrying the mould forward after being filled. The mould is placed into the machine at the opening $k$, fig. 1, forward of the rod $l$ on the carriage, and is brought forward under the grate $d$ by means of the lever $m$, which, as it brings an empty mould under, presses forward the filled one down to the outer edge of the carriage, to be taken away by the operator. Fig. 4 represents the mould. The particular improvement I claim to have made on the mould is to use only one thumb-catch, $o\ o$, at the ends, for the purpose of pressing forward the wood or metal bottoms $p\ p\ p\ p$ to exclude the brick from the mould.

What I claim as new in my invention, and desire to secure by Letters Patent, is—

1. The combination of the shaft $b$, provided with the radial mixers, with the double-inclined spiral plane $e$ and friction-rollers $ff$.

2. I claim the carriage $g$, of the peculiar shape and construction shown, in combination with the dogs $i\ i$ and rod $l$, with operating lever $m$, when arranged and operating substantially as described.

SAMUEL SHREFFLER.

Witnesses:
  THOS. H. HUTCHINS,
  H. RUSSELL.